(12) United States Patent
Gao

(10) Patent No.: US 8,998,092 B2
(45) Date of Patent: Apr. 7, 2015

(54) SYSTEMS AND METHODS OF OPTICAL CODE READING USING A COLOR IMAGER

(71) Applicant: Datalogic ADC, Inc., Eugene, OR (US)

(72) Inventor: WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/307,373

(22) Filed: Jun. 17, 2014

(65) Prior Publication Data

US 2014/0339309 A1    Nov. 20, 2014

Related U.S. Application Data

(62) Division of application No. 12/707,879, filed on Feb. 18, 2010, now Pat. No. 8,800,874.

(60) Provisional application No. 61/154,247, filed on Feb. 20, 2009.

(51) Int. Cl.
  *G06K 7/12*     (2006.01)
  *G06K 7/10*     (2006.01)

(52) U.S. Cl.
  CPC ........ *G06K 7/10722* (2013.01); *G06K 7/10841* (2013.01); *G06K 7/12* (2013.01); *G06K 7/1096* (2013.01); *G06K 7/10831* (2013.01)

(58) Field of Classification Search
  CPC ... G06K 7/10841; G06K 7/12; G06K 7/1456; G06K 9/78; G06K 7/10861; G06K 7/10; G06K 7/10722; G06K 7/10831; G06K 7/1096; G06Q 30/00; G07G 1/0036

USPC ........... 235/375, 383, 454, 462.08, 469, 470, 235/440, 462.42
See application file for complete search history.

(56) References Cited

U.S. PATENT DOCUMENTS 3,971,065 A    7/1976 Bayer
4,339,745 A    7/1982 Barber et al.
(Continued)

FOREIGN PATENT DOCUMENTS

EP    0944267 A2    9/1999
EP    1 223 535 A2    7/2002
(Continued)

OTHER PUBLICATIONS

Malvar et al., High-Quality Linear Interpolation for Demosaicing of Bayer-Patterned Color Images, May 2004, 4 pp.
(Continued)

*Primary Examiner* — Sonji Johnson
(74) *Attorney, Agent, or Firm* — Stoel Rives LLP

(57) ABSTRACT

Systems and methods of optical code reading include production of image data by a color image sensor array and processing of the image data to decode an optical code. In one configuration, the color image sensor array includes first and second sets of sensor pixels sensitive to light having different wavelengths. Reflected light is focused by an optical system to form one or more images of an optical code on the color image sensor array. The optical system includes optics to form first and second images of an object bearing the optical code, where the first image excludes light of the second wavelength and the second image excludes light of the first wavelength, thereby enabling the first set of sensor pixels to sense the first image without substantially sensing the second image and the second set of sensor pixels to sense the second image without substantially sensing the first image.

19 Claims, 10 Drawing Sheets

(56) References Cited

U.S. PATENT DOCUMENTS

| | | |
|---|---|---|
| 4,642,678 A | 2/1987 | Cok |
| 5,243,655 A | 9/1993 | Wang |
| 5,308,966 A | 5/1994 | Danielson et al. |
| 5,373,322 A | 12/1994 | Laroche et al. |
| 5,506,619 A | 4/1996 | Adams et al. |
| 5,596,367 A | 1/1997 | Hamilton et al. |
| 5,714,745 A | 2/1998 | Ju et al. |
| 5,786,582 A | 7/1998 | Roustaei et al. |
| 5,804,805 A | 9/1998 | Koenck et al. |
| 6,628,330 B1 | 9/2003 | Lin |
| 6,642,962 B1 | 11/2003 | Lin et al. |
| 6,722,569 B2 | 4/2004 | Ehrhart et al. |
| 6,765,703 B1 | 7/2004 | Watanabe |
| 6,832,729 B1 | 12/2004 | Perry et al. |
| 6,889,904 B2 | 5/2005 | Bianculli et al. |
| 6,976,629 B2 | 12/2005 | Carlson |
| 6,976,631 B2 | 12/2005 | Kashi et al. |
| 7,014,113 B1 | 3/2006 | Powell et al. |
| 7,014,114 B2 | 3/2006 | Maiman |
| 7,025,266 B2 | 4/2006 | Keithley |
| 7,071,978 B2 | 7/2006 | Hunter et al. |
| 7,163,149 B2 | 1/2007 | He et al. |
| 7,198,195 B2 | 4/2007 | Bobba et al. |
| 7,224,540 B2 | 5/2007 | Olmstead et al. |
| 7,237,721 B2 | 7/2007 | Bilcu et al. |
| 7,357,322 B2 | 4/2008 | Patel |
| 7,387,252 B2 | 6/2008 | Gannon et al. |
| 7,594,609 B2 | 9/2009 | Kotlarsky et al. |
| 7,626,769 B2 | 12/2009 | Olmstead et al. |
| 7,695,608 B2 | 4/2010 | Kim et al. |
| 2002/0050518 A1 | 5/2002 | Roustaei |
| 2003/0161010 A1 | 8/2003 | Schinner |
| 2005/0011956 A1 | 1/2005 | Carlson |
| 2005/0056699 A1 | 3/2005 | Meier et al. |
| 2006/0022051 A1 | 2/2006 | Patel |
| 2006/0027657 A1 | 2/2006 | Ninnink et al. |
| 2006/0060653 A1 | 3/2006 | Wittenberg et al. |
| 2006/0202036 A1 | 9/2006 | Wang et al. |
| 2006/0208083 A1 | 9/2006 | Kotlarsky et al. |
| 2006/0221226 A1 | 10/2006 | Yanof et al. |
| 2006/0274171 A1 | 12/2006 | Wang |
| 2006/0278708 A1 | 12/2006 | Olmstead |
| 2006/0283952 A1 | 12/2006 | Wang |
| 2007/0091332 A1 | 4/2007 | Nunnink |
| 2007/0297021 A1 | 12/2007 | Smith |
| 2008/0029602 A1 | 2/2008 | Burian et al. |
| 2008/0107354 A1 | 5/2008 | Dowski et al. |
| 2008/0169347 A1 | 7/2008 | Olmstead |
| 2008/0179402 A1* | 7/2008 | Barkan et al. ............ 235/462.41 |
| 2008/0199095 A1 | 8/2008 | Kansal |
| 2008/0218610 A1 | 9/2008 | Chapman et al. |
| 2009/0159685 A1 | 6/2009 | Shi et al. |
| 2009/0206161 A1 | 8/2009 | Olmstead |
| 2010/0200658 A1 | 8/2010 | Olmstead |

FOREIGN PATENT DOCUMENTS

| | | |
|---|---|---|
| JP | 06-309486 | 4/1994 |
| JP | 8123923 A | 5/1996 |

OTHER PUBLICATIONS

Frédéric et al., Advances in Camera Phone Picture Quality, Photonics Spectra, Nov. 2007, 2 pp.

Tisse et al., Extended depth-of-field (EDoF) Using Sharpness Transport Across Colour Channels, Proceedings of Electronic Imaging vol. 7250, Jan. 19, 2009, 11 pp.

International Search Report & Written Opinion, International Application No. PCT/US2009/063713, May 31, 2010, 11 pp.

International Search Report & Written Opinion, International Application No. PCT/US2010/023918, Oct. 4, 2010, 12 pp.

International Search Report & Written Opinion, International Application No. PCT/US2010/024712, Oct. 4, 2010, 12 pp.

Extended European Search Report & Written Opinion, International Application No. PCT/US2009/063713, Jul. 9, 2012, 8 pp.

Notification of First Office Action, Chinese Application No. 2010800008835.1, Aug. 14, 2013, 20 pp.

State Intellectual Property Office of PRC, Second Office action, China Application No. 201080008835.1, Apr. 22, 2014, 33 pp. (including translation).

European Patent Office, Extended European Search Report, Application No. EP 14 16 0536, Jun. 11, 2014, 7 pgs.

* cited by examiner

SYSTEMS AND METHODS OF OPTICAL CODE READING USING A COLOR IMAGER

RELATED APPLICATION

This application is a divisional of and claims the benefit under 35 U.S.C. §120 from U.S. application Ser. No. 12/707,879, filed Feb. 18, 2010, which is a nonprovisional of and claims the benefit under 35 U.S.C. §119(e) of U.S. Provisional Application No. 61/154,247, titled "Systems and Methods of Optical Code Reading Using a Color Imager," filed Feb. 20, 2009, the disclosures of which are incorporated herein by reference.

BACKGROUND INFORMATION

The field of this disclosure relates generally to systems and methods of data reading, and more particularly but not exclusively to reading optical codes (e.g., bar codes).

Optical codes encode useful, optically-readable information typically about the items to which they are attached or otherwise associated. Perhaps the most common example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item. A typical linear or one-dimensional bar code, such as a UPC code, consists of alternating bars (i.e., relatively dark areas) and spaces (i.e., relatively light areas). In a UPC code, for example, the pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Linear bar codes are just one example of the many types of optical codes in use today. Higher-dimensional optical codes, such as, two-dimensional matrix codes (e.g., MaxiCode) or stacked codes (e.g., PDF 417), which are also sometimes referred to as "bar codes," are also used for various purposes.

Different methods and types of optical code readers are available for capturing an optical code and for decoding the information represented by the optical code. For example, image-based optical code readers are available that include imagers, such as charge coupled devices (CCDs) or complementary metal oxide semiconductor (CMOS) imagers, that generate electronic image data that represent an image of a captured optical code. Image-based optical code readers are used for reading one-dimensional optical codes and higher-dimensional optical codes. Because optical codes most often include dark and light patterns (e.g., black and white) that represent binary data, imagers of image-based optical code readers are typically monochrome so that uniform sensitivity for each pixel of the imager is achieved.

Common imagers made for image capturing devices, such as still cameras and video cameras, however, are color imagers—not monochrome. Because imagers made for many image capturing devices are color, color imagers are generally made in higher volume and have become more widely available and may be less expensive than monochrome imagers. Some image-based optical code readers have included color imagers, but the inventor has recognized that these optical code readers have not effectively achieve high-speed decoding or high-resolution imaging.

SUMMARY OF THE DISCLOSURE

This disclosure describes improved optical code reading devices and associated methods. In one embodiment, image data produced by a color image sensor array implemented in an optical code reader is processed to decode an optical code. The color image sensor array includes a first set and a second set of sensor pixels that are sensitive to light having wavelengths within, respectively, a first wavelength band and a second wavelength band. A field of view of the optical code reader is illuminated to produce light reflected off an optical code toward an optical system of the optical code reader. The optical system focuses the reflected light to form an image of the optical code on the color image sensor array. First and second sets of image data representing light intensity levels sensed by, respectively, the first and second sets of sensor pixels are produced. The first set of image data is processed to determine whether the second set of image data is to be used in combination with the first set of image data to decode the optical code.

Additional aspects and advantages will be apparent from the following detailed description of preferred embodiments, which proceeds with reference to the accompanying drawings.

DETAILED DESCRIPTION OF PREFERRED EMBODIMENTS

I. Overview

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Various imager-based optical code readers and associated methods are described herein. Particularly, the imager-based optical code readers described herein utilize a color image sensor array (i.e., a color imager), rather than a monochrome imager.

Figure 1:
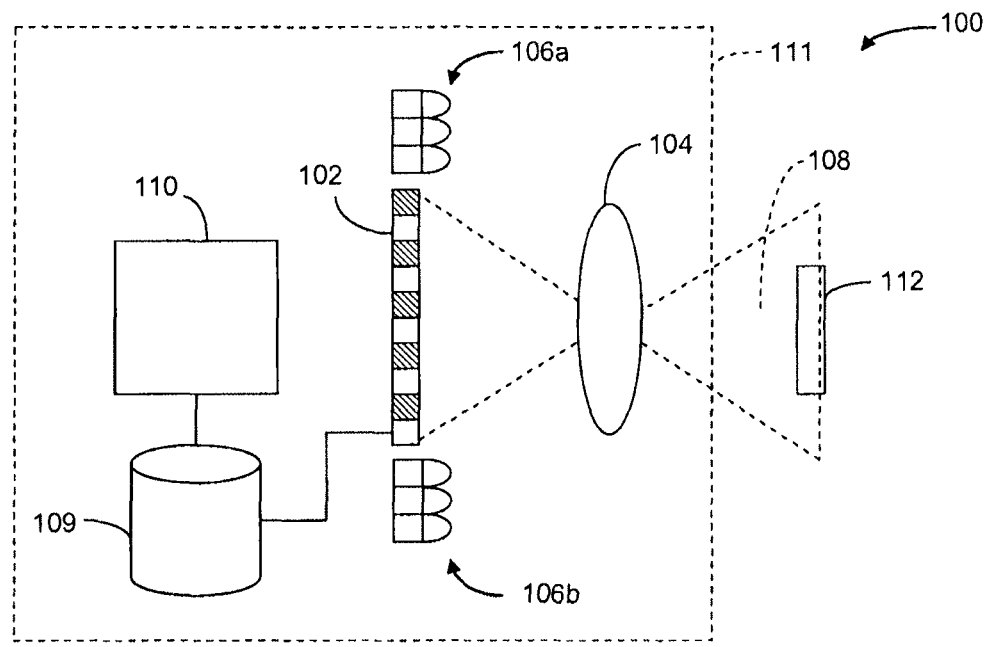
FIG. 1 is a diagram of an optical code reader according to one embodiment.
Figure 2:
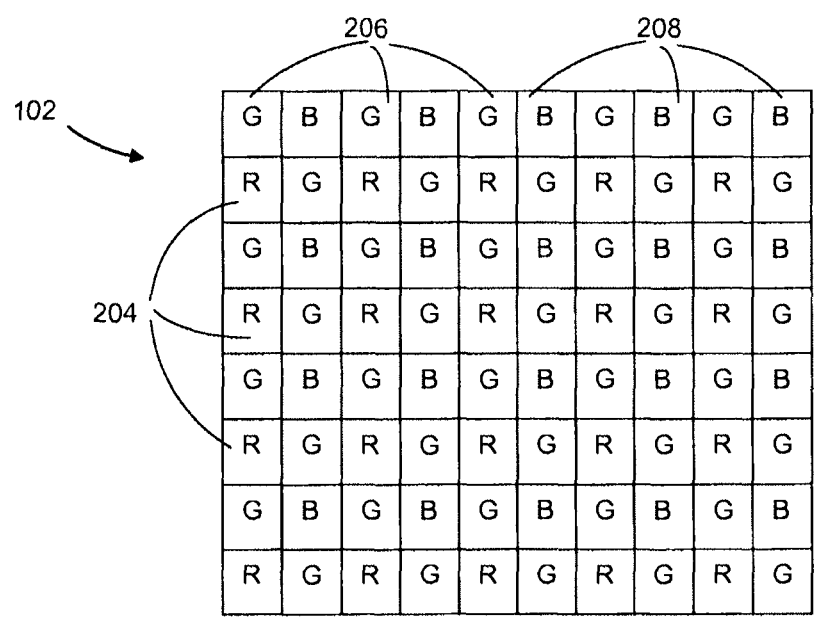
FIG. 2 is a diagram of a color image sensor array used in the optical code reader of FIG. 1.

FIG. 1 is a block diagram of an optical code reader 100 according to one embodiment. The optical code reader 100 may be any type of reader, such as, but not limited to, a hand-held type reader, a fixed-position reader, a stationary reader, a personal digital assistant (PDA) reader, or an automatic reader. The optical code reader 100 includes a color image sensor array 102, which in this example is comprised of red sensor pixels 204, green sensor pixels 206, and blue sensor pixels 208 arranged in a Bayer pattern as shown in FIG. 2. The sets of red sensor pixels 204, green sensor pixels 206, and blue sensor pixels 208 correspond to different color planes—red, green, and blue color planes respectively. The color image sensor array 102 may be a charge coupled device (CCD), such as a full-frame, frame-transfer, or interline-transfer CCD. Alternatively, the color image sensor array 102 may be a complementary metal oxide semiconductor (CMOS) imager, such as a global shuttered or rolling-reset CMOS imager. The color image sensor array 102 may include any number of sensor pixels (e.g., several megapixels). An RGB color imager described herein is just one example of a color imager that may be used in one or more of the embodiments. For example, the color image sensor array 102 may include a different filter such as a cyan, yellow, green, and magenta (CYGM) filter or a red, green, blue, and emerald (RGBE). The imaging device 100 and its associated methods are flexible to compensate for the effects of different types of color imagers.

The red sensor pixels 204 of color image sensor array 102 are sensitive to visible light having wavelengths that correspond to the color red (wavelengths ranging between about 600 nanometers (nm) and about 750 nm). The green sensor pixels 206 are sensitive to visible light having wavelengths that correspond to the color green (wavelengths ranging between about 500 nm and about 600 nm). The blue sensor pixels 208 are sensitive to visible light having wavelengths that correspond to the color blue (wavelengths ranging between about 400 nm and about 500 nm). The red, green, and blue sensor pixels 204, 206, and 208 produce, respectively, red, green, and blue sets of image data representing light intensities sensed by the sensor pixels.

The optical code reader 100 includes an optical system 104 positioned to focus light on the color image sensor array 102. The optical system 104 may include conventional optical components, such as one or more mirrors, one or more lenses, an aperture, and, in some cases, a mechanical shutter. As an alternative to a mechanical shutter, the color image sensor array 102 may include an electronic shutter.

The optical code reader 100 includes one or more artificial illumination sources 106 positioned to illuminate a field of view 108 of the optical code reader 100 (six artificial illumination sources 106a and 106b are shown in FIG. 1). Alternatively, the optical code reader 100 need not include illumination sources 106. For example, the optical code reader 100 may rely on ambient light to illuminate the field of view 108 instead of the artificial illumination sources 106a and 106b. Details of the illumination sources are set forth below.

The optical code reader 100 includes a data capturing/storage system 109 and a data processing system 110. The data capturing/storage system 109 is operable to receive and store image data produced by the color image sensor array 102 and to supply to the image data to the data processing system 110. The data capturing/storage system 109 may include any type of computer-readable medium, which include storage devices. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes.

The data processing system 110 may include hardware such as, but not limited to, camera interface hardware. The data processing system 110 may include conventional hardware and one or more programmable central processing units (CPU). The data processing system 110 may be operable to perform various processing functions to decode an optical code 112 positioned within the field of view 108 of the optical code reader 100. Various parts of and operations that may be performed by the data processing system 110 are described below. Data capture, storage, and processing may also be done by a single processor.

The data processing system 110 includes different units. As used herein, the term "unit" is a component that may comprise one or more hardware circuits or devices and/or one or more software routines, functions, object or the like. A unit may be entirely hardware, entirely software, comprise firmware, or comprise some combination of the foregoing. As used herein, the term "system" refers to a tangible thing or a combination of functional components.

The methods, units and systems illustrated and described herein can exist in a variety of forms both active and inactive. For example, they can exist partly or wholly as one or more software programs comprised of program instructions in source code, object code, executable code or other formats. Any of the above can be embodied in compressed or uncompressed form on computer-readable medium. Some examples of suitable computer-readable medium are provided above.

The data processing system 110 may be contained within a housing 111 of the optical code reader 100. Alternatively, the data processing system 110 may be external to the housing of the optical code reader 100, the data processing system 110 and the optical code reader 100 may communicate through a wired (e.g., EIA232, USB) or wireless (e.g., WLAN, Bluetooth®) communication link, and the data processing system 110 may communicate simultaneously with multiple optical code readers 100.

In operation, the illumination sources 106a and 106b illuminate the field of view 108. Light is reflected off the optical code 112 toward the optical system 104 and focused by the optical system 104 (e.g., one or more lenses) onto the color image sensor array 102. The focused light forms an image of the optical code on the color image sensor array 102 and the sensor pixels 204, 206, and 208 produce, respectively, red, green, and blue sets of image data representing sensed light intensity values. The red, green, and blues sets of image data are stored in the data capturing/storage system 109 and transmitted from the data capturing/storage system 109 to the data processing system 110 for processing as described below.

II. Illumination Matching

Figure 3:
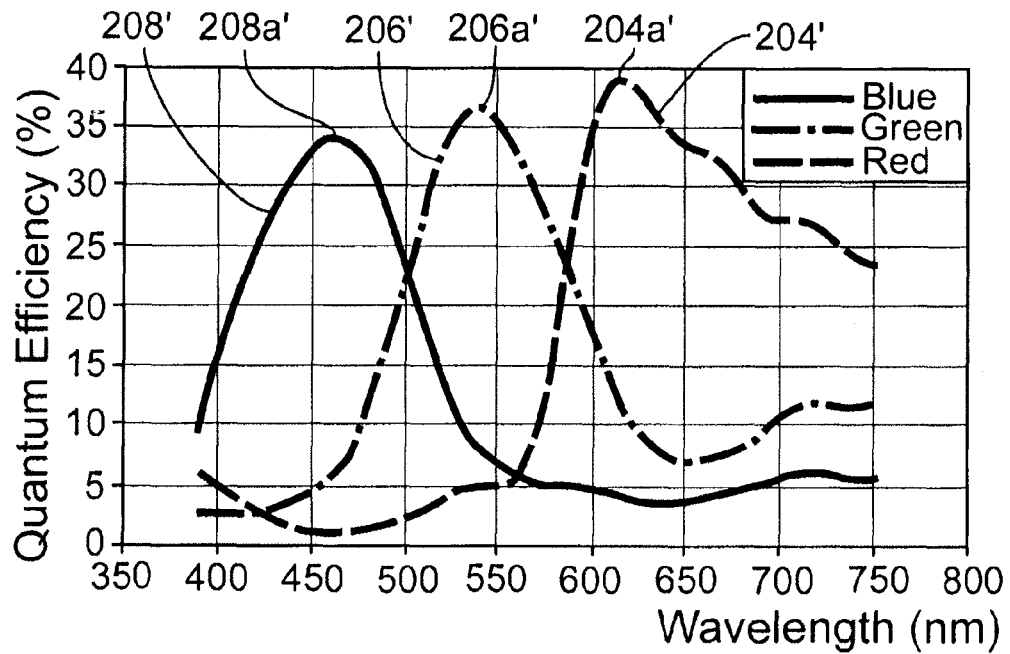
FIG. 3 is a graph of the sensitivity of red, green, and blue sensor pixels as a function of light wavelength of an illustrative color image sensor array used in the optical code reader of FIG. 1.

The color image sensor array 102 and the illumination sources 106 are described in more detail below with reference to FIGS. 3 and 4. Illumination sources 106a and 106b may include multiple light sources of different color to match the sensitivity spectrum of the red, green, and blue sensor pixels 204, 206, and 208 of the color image sensor array 102. Six illumination sources, each corresponding to one of three colors, are depicted in FIG. 1 as one example (e.g., sources 106a on the top having one each of red, green, and blue and sources 106b on the bottom having one each of red, green, and blue—the red, green and blue sources may be in a single package such as a multiLED LTAB G66x available from OSRAM GmbH of Munich, Germany). In most applications for known cameras, lighting is controlled to mimic a standard eye response to light so that a natural looking image can be produced by the camera. For example, a conventional application may use one or more white light emitting diodes (LEDs) with a broad spectrum (such as cool white or warm white LEDs available from OSRAM GmbH). In the present embodiment, however, illumination is controlled to improve light efficiency and/or sensitivity of the optical code reader 100. For example, FIG. 3 depicts a graph of the quantum efficiency percentage versus the wavelength of light incident upon red, green and blue sensor pixels of a model MT9M001 color imager available from Aptina Imaging Corporation of San Jose, Calif. that may be used as the color image sensor array 102. Various other color imagers available from Aptina and other sources may be used. A curve 204', corresponding to the spectral sensitivity of the red sensor pixels 204, has a local peak 204a' at a wavelength corresponding to the color red. A curve 206', corresponding to the spectral sensitivity of the green sensor pixels 206, has a local peak 206a' at a wavelength corresponding to the color green. A curve 208', corresponding to the spectral sensitivity of the blue sensor pixels 208, has a local peak 208a' at a wavelength corresponding to the color blue.

Figure 4:
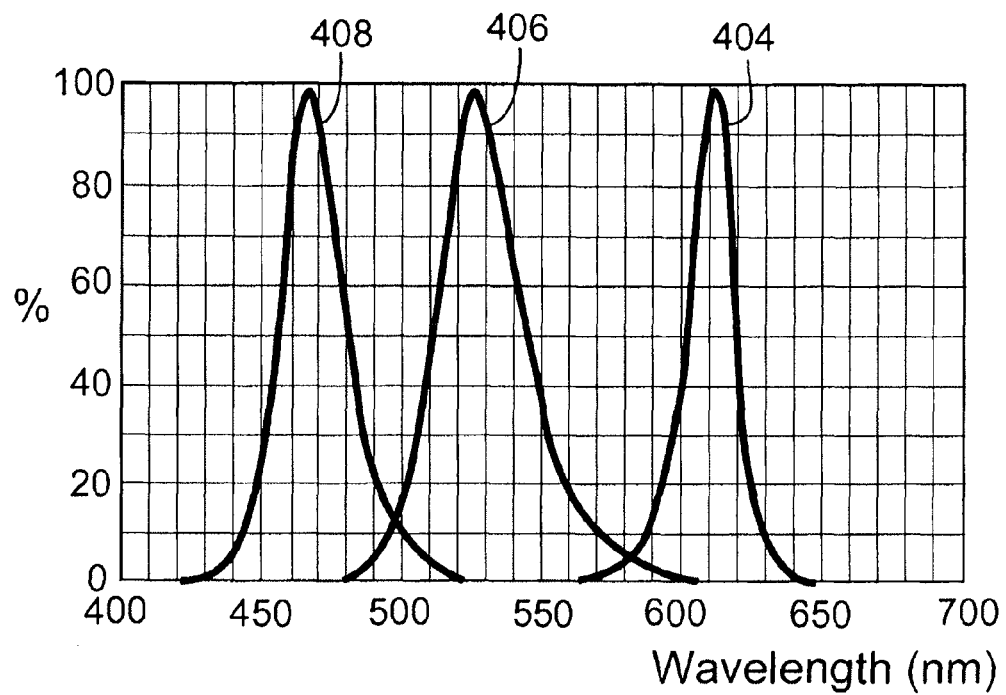
FIG. 4 is a graph of the relative spectral emissions as a function of light wavelength of three light emitting diodes that may be used as illumination sources for the optical code reader of FIG. 1.

FIG. 4 depicts three waveforms 404, 406, and 408 that represent the relative spectral emissions versus wavelength of light of three different LEDs that may be used as illumination sources 106. Waveform 404 represents the relative spectral emission of a model LO T676 LED available from OSRAM GmbH with a peak emission wavelength of approximately 610 nm, which approximately coincides with the wavelength corresponding to the local peak 204a' of the curve 204'. Waveform 406 represents the relative spectral emission of a model LT T673 LED available from OSRAM GmbH with a peak emission wavelength of approximately 523 nm, which approximately coincides with the wavelength corresponding to the local peak 206a' of the curve 206'. Waveform 408 represents the relative spectral emission of a model LB T673 LED available from OSRAM GmbH with a peak emission wavelength of approximately 465 nm, which approximately coincides with the wavelength corresponding to the local peak 208a' of the curve 208'. Any suitable illumination sources that emit light having wavelengths corresponding to the colors of the color image sensor array 102 (e.g., red, green, and blue) may be used. Because the illumination sources 106 have peak emissions at wavelengths that approximately correspond to the colors of the color image sensor array 102, light efficiency of the optical code reader 100 may be improved. Illumination sources 106 may be turned on simultaneously, or, alternatively, illumination sources 106 may be turned on sequentially to provide peak current and/or LED on time pulse width control. Moreover, the illumination of the three colors of the illumination sources 106 may be varied for other purposes. One of the three colors of the illumination sources 106 may be turned on to indicate the operating status of the optical code reader 100. For example, a green illumination source may be illuminated to indicate that an optical code has been successfully read by the optical code reader 100; a red illumination source may be controlled to flash to indicate that the optical code reader 100 is busy with program/configuration loading; and a blue illumination source may be controlled to gradually dim to indicate that the optical code reader 100 is in sleep mode.

III. Calibration of Color Channels

Figure 5:
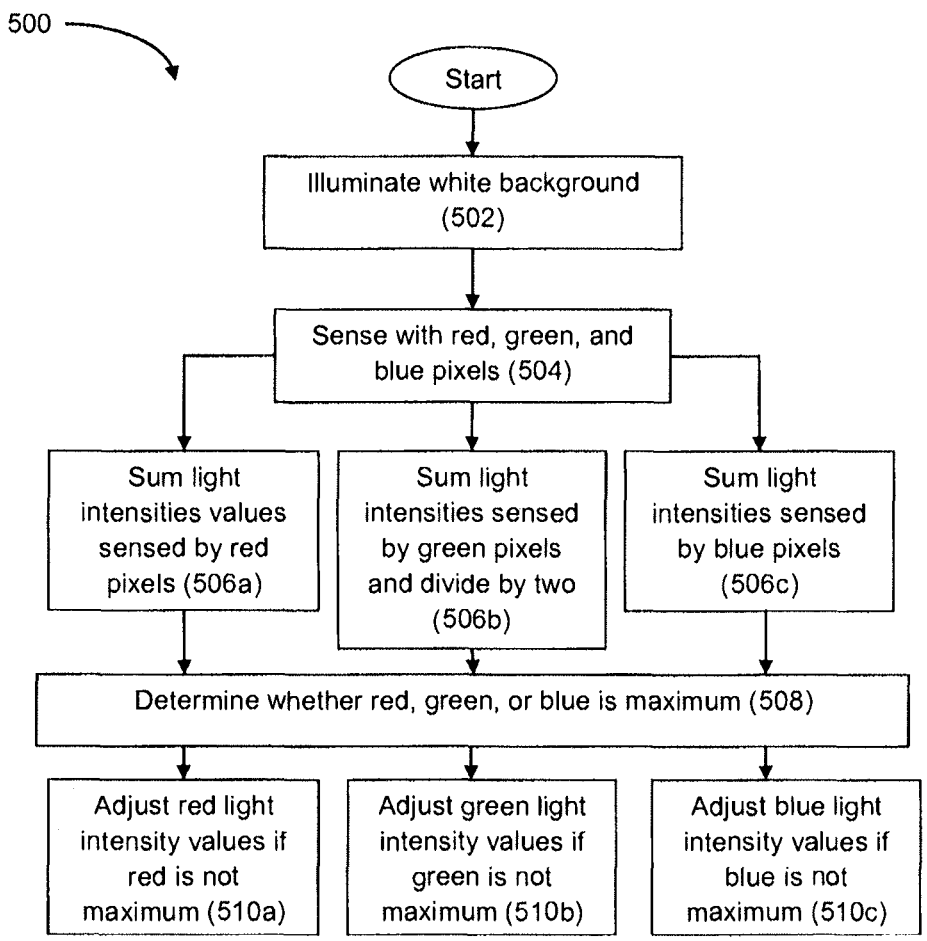
FIG. 5 is a flowchart showing the steps of a calibration process that may be implemented in the optical code reader of FIG. 1.

Prior to operation, the different color channels (e.g., red, green, and blue) of the optical code reader 100 are preferably calibrated to adjust for differences in illumination and/or sensitivity (e.g., quantum efficiency) between red, green, and blue channels, which include red, green, and blue sensor pixels 204, 206, and 208 and corresponding illumination sources 106. However, calibration of the color channels may be omitted. For the color image sensor array 102, the patterned color filter that covers the array of sensor pixels effects the transmittance of light, and, thus, the intensity of light that is incident on the sensor pixels 204, 206, and 208. Also, the transmittance of light associated with the filter portions may be different between colors such that the filter portions of one color may transmit more (or less) light than the filter portions of the other colors. Moreover, the sensor pixels behind the filter portions may be inherently more or less sensitive to certain wavelengths of light (e.g., the sensor pixels may be more sensitive to red wavelengths than to blue and green wavelengths). The effects of the color dependent differences in light transmittances and pixel sensitivities can be seen in the example of FIG. 3 in which the quantum efficiencies associated with the local peaks 204a', 206a' and 208a' are different from one another. Moreover, the intensity of light produced by the red, green, and blue illumination sources 106 (i.e., red, green, and blue LEDs) may be different. FIG. 5 is a flow chart of a calibration process 500 that may be used for the optical code reader 100. The calibration process 500 corresponds to using reflected light produced by illumination sources 106 to calibrate the optical code reader 100. However, other calibration methods may be used such as shining light (from illumination sources 106 or another light source) directly on the color image sensor array 102 during or after assembly of the optical code reader 100.

According to method 500, a white background, such as a white piece of paper, is positioned in the field of view 108 of the optical code reader 100 so as to provide a uniform background for accurately determining the light intensities produced by the red, green and blue illumination sources 106 and the sensitivities corresponding to the red, green, and blue sensor pixels 204, 206, and 208. The illumination sources 106 may then be illuminated to illuminate the white background (step 502). Light is reflected off the white background toward the optical system 104 of the optical code reader 100. The reflected light is focused on the red, green, and blue sensor pixels 204, 206, and 208 of the color image sensor array 102. The red, green, and blue sensor pixels 204, 206, and 208 sense the focused light and produce, respectively, red, green, and blue sets of image data representing the sensed light intensities (step 504). The intensity values sensed by the red sensor pixels 204 are summed; the intensity values sensed by the green sensor pixels 206 are summed and the total for the green sensor pixels 206 is divided by two (because there are twice as many green sensor pixels in the Bayer pattern as red or blue sensor pixels); and the intensity values sensed by the blue sensor pixels 208 are summed (steps 506*a*, 506*b*, and 506*c*). The totals from the three sets of image data are compared to identify the set with the highest total (step 508). Gains are applied to the channels that are determined to not have the highest total to balance the intensity levels of the different channels so that a relatively uniform gray-scale image of the white background may be represented by the three channels (steps 510*a*, 510*b*, and 510*c*). For example, if the total of the image data produced by the red sensor pixels is the highest, gains for the green and blue channels may be determined as follows and applied to the intensity values produced by the green and blue channels:

Green channel gain=$GS/GS\_G$

Blue channel gain=$GS/GS\_B$ where GS is the sum of the intensity values of red set of image data, GS_G is the sum divided by two of the intensity values of the green set of image data, and GS_B is the sum of the intensity values of the blue set of image data. Unity gain may be applied to the red channel. The gains may be applied as register settings of the color image sensor array 102 or through processing in the data processing system 110. By determining the gains for the different channels prior to reading the optical code 112, the optical code reader 100 may be calibrated without requiring a significant increase in processing time during real-time operation.

IV. Data Processing System and Operations

Figure 6:
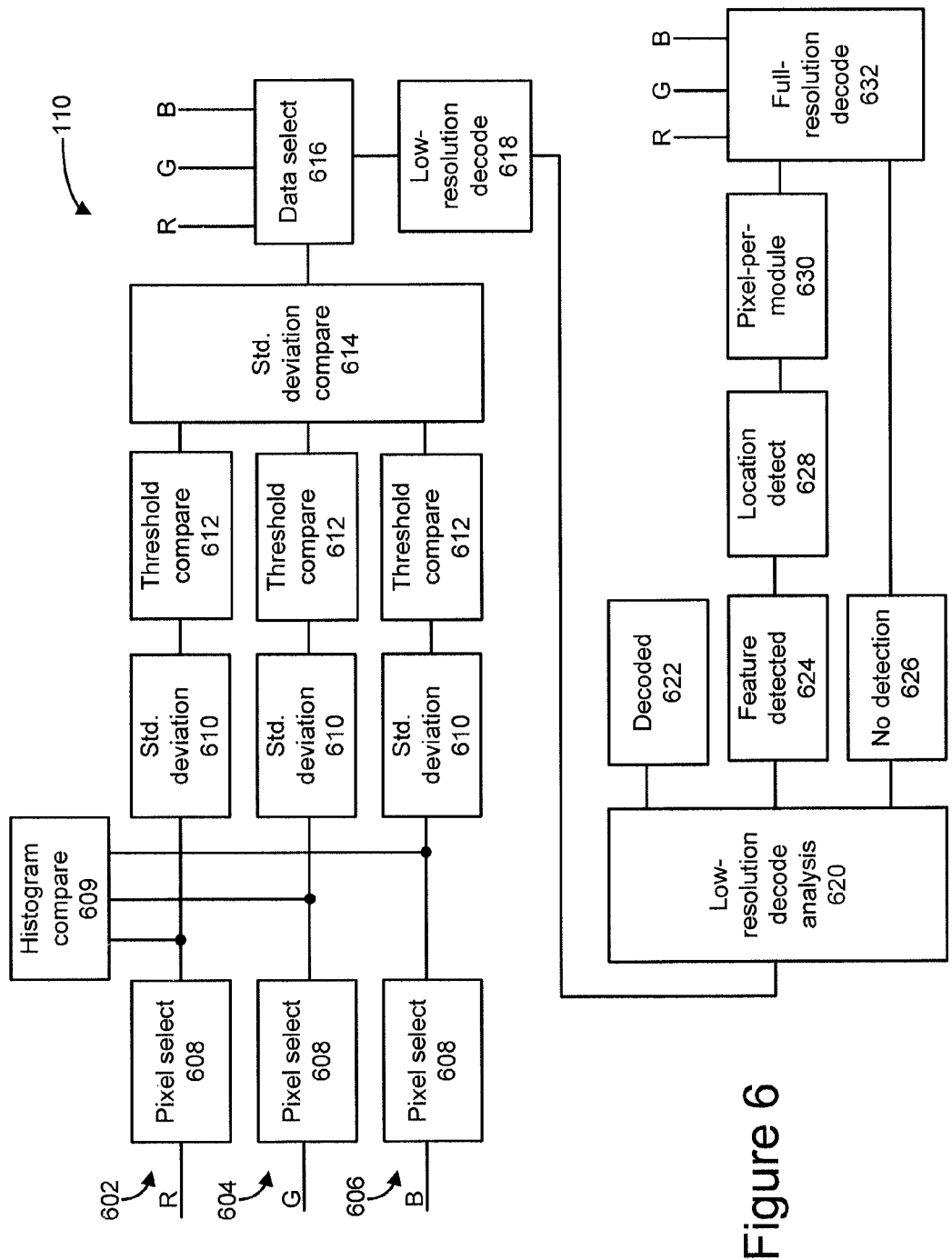
FIG. 6 is a block diagram of various modular processing units of a data processing system that may be used in the optical code reader of FIG. 1.

The data processing system 110 and its various operations are described below with reference to FIGS. 6-10. FIG. 6 is a block diagram of various modular processing units of the data processing system 110. The data processing system 110 includes three processing channels 602, 604, and 606 that include pixel selection units 608, a histogram comparison unit 609, standard deviation calculation units 610, and threshold comparison units 612. The data processing system 110 may include more (or less) than three processing channels. Although each channel 602, 604, and 606 is shown as having its own pixel selection unit 608, standard deviation calculation unit 610, and threshold comparison unit 612, the channels need not have their own separate units 608, 610, and 612. Moreover, each of the units 608, 609, 610, and 612 are optional and may be omitted. The three processing channels 602, 604, and 606 correspond to the three sets of image data corresponding to the colors red (R), green (G), and blue (B) of the color image sensor array 102.

Figure 8:
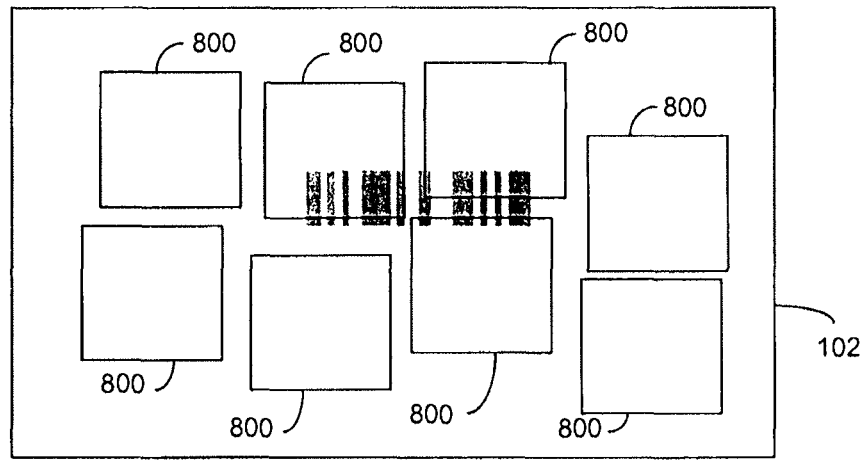
FIG. 8 is a diagram depicting an image of an optical code formed on a color image sensor array, together with eight subareas of the color image sensor array that are selected by pixel selection units of the data processing system of FIG. 6.
Figure 9:
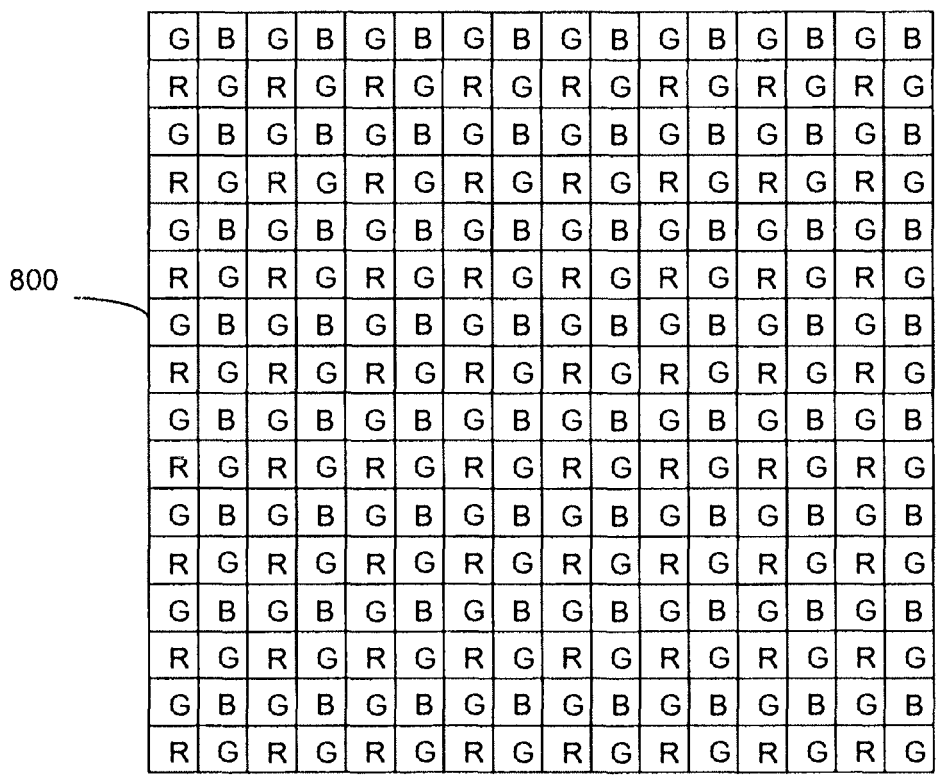
FIG. 9 is a diagram showing a close up view of one of the subareas of FIG. 8.

Each pixel selection unit 608 is operable to select for further processing a portion (e.g., a subset of image data) of the corresponding image data set. The portion of the image data set represents light intensity levels sensed by sensor pixels located at different subareas in the color image sensor array 102. For example, FIG. 8 shows locations of eight different subareas 800 relative to the surface of the color image sensor array 102 upon which an image of the optical code 112 is formed. The pixel selection unit 608 may select more or less than eight subareas 800. A subarea 800 may include any number of sensor pixels 204, 206, and 208, such as, but not limited to, 16 rows and 16 columns of sensor pixels 204, 206, and 208 as depicted in FIG. 9. Each pixel selection unit 608 selects the image data produced by the red, blue, or green sensor pixels 204, 206, or 208 located within the subareas 800.

The histogram comparison unit 609 is operable to calculate an image histogram of the light intensities represented in the image data. Each pixel selection unit 608 supplies to the histogram comparison unit 609 the light intensities sensed by the red, green, or blue sensor pixels 204, 206, or 208 located in the subareas 800. Alternatively, the histogram comparison unit 609 may select a number of pixels of the color image sensor array 102 different from the pixels selected by the pixel selection units 608. The histogram comparison unit 609 compares the image histogram to a selected light intensity threshold value (i.e., a histogram threshold) to determine whether the image sensed by the color image sensor array 102 is too dark (e.g., no decodable optical code is in the image). For example, out of 256 gray-scale values (a higher value representing a higher light intensity), a histogram threshold of about 100 to about 10 may be selected, preferably about 40. Although 256 gray-scale values are given as an example, the data processing system 110 may calculate and use more (or less) than 256 gray-scale values. The histogram threshold may be adaptable for different types of optical code scanning systems. The histogram comparison units 609 may be operable to determine the percentage of the light intensities of the image histogram that are at or below the histogram threshold. If the percentage of light intensities at or below the threshold is equal to or greater than a selected percentage, the image is deemed too dark and the data processing system 110 instructs the color image sensor array 102 to capture a new image. The selected percentage may be any suitable percentage such as about 70% to about 100%, preferably greater than 90%. Thus, for example, with a histogram threshold of 40 and a selected percentage of 98%, if 98% or more of the light intensities of the image histogram are at or below the gray-scale value of 40, the image is not processed and a new image is captured. On the other hand, if less than 98% of the light intensities are at or below the gray-scale value of 40, the histogram comparison unit 609 determines that the image is not too dark, and the image data are supplied to the standard deviation units 610.

The standard deviation calculation units 610 are operable to calculate statistical characteristics of light intensity values represented in the image data. The statistical characteristics preferably correspond to intensity variations of the light intensity values. In one example, the statistical characteristics correspond to standard deviations of the light intensities represented in the image data. Each pixel selection unit 608 supplies to the standard deviation calculation unit 610 the light intensities sensed by the red, green, or blue sensor pixels 204, 206, and 208 located in the subareas 800. Each standard deviation calculation unit 610 calculates the standard deviations of light intensities for the different subareas 800. For example, the standard deviation calculation unit 610 of the red channel 602 calculates eight standard deviations for the intensity values sensed by the red sensor pixels 204 located in the eight subareas 800 of FIG. 8—one standard deviation for each subarea 800. The standard deviation calculation unit 610 of the red channel 602 then averages the eight standard deviations it calculated to obtain an average standard deviation for the subareas 800, and the average standard deviation is used as the standard deviation for the red channel 602. Alternatively, the standard deviation calculation unit 610 may select the highest standard deviation of the eight subareas 800 as the standard deviation for the red channel 602. The standard deviation calculation units 610 of the green and blue channels 604 and 606 also calculate standard deviations for the green and blue channels 604 and 606 as explained above with respect to the red channel 602.

The threshold comparison units 612 are operable to compare the standard deviations of the channels 602, 604, and 606 to a selected standard deviation threshold value to determine whether the standard deviations are below the threshold value. The threshold value may be the same or different for each channel 602, 604, and 606. From the comparison performed by the threshold comparison units 612, the data processing system 110 identifies whether to terminate early processing of the image captured by the color image sensor array 102 because no discernable optical code is within the field of view 108. As such, the threshold level may be selected so as to indicate whether the optical code 112 is within the field of view 108. A typical optical code with a pattern of light and dark indicia will produce a high standard deviation when in the field of view 108 because its image will not have uniform light intensities across the image. Thus, when the standard deviation is below the threshold level (e.g., when the standard deviation is approximately zero), an optical code most likely is not within the field of view 108 (e.g., the optical code 112 is too far away from the optical code reader 100). In one example, out of 256 gray-scale values, the threshold level may be about 50 to about one, preferably less than ten (e.g., about 7). When the standard deviations of the channels 602, 604, and 606 are all below the threshold level, the data processing system 110 terminates processing of the red, green, and blue sets of image data without attempting to decode, and the color image sensor array 102 captures a new frame of an image to process.

The data processing system 110 preferably includes a standard deviation comparison unit 614. However, the standard deviation comparison unit 614 may be omitted. When one or more standard deviations of the channels 602, 604, and 606 are above the threshold level, the standard deviations may be compared by a standard deviation comparison unit 614. The standard deviation comparison unit 614 is operable to identify the channel that most accurately distinguishes between light and dark elements of the optical code 112. The standard deviations are useful in identifying the color in which the light and dark elements of the optical code 112 can be most distinguished—a higher standard deviation indicating that the dark and light elements are more distinguishable in that color. For example, one type of optical code may be most distinguishable in the red color plane while a second type of optical code may be most distinguishable in the green color plane (e.g., colored optical codes). Thus, the standard deviation comparison unit 614 compares the standard deviations of the channels 602, 604, and 606 and identifies the red, green, or blue set of image data as the set that includes the most distinguishable representations of locations of demarcation edges (i.e., transitions) between light and dark elements of the optical code 112. In other words, the standard deviation comparison unit 614 identifies the red, green, or blue image data set as the set with the highest standard deviation.

The data processing system 110 preferably includes a data set selection unit 616 that receives a signal from the standard deviation comparison unit 614 indicating the set of image data with the highest standard deviation. However, the data processing system 110 need not include the data set selection unit 616. The data set selection unit 616 is operable to select as a target set of image data the set of image data with the highest standard deviation to be used to decode the optical code 112 via a low-resolution decoding unit 618. For example, when the standard deviation comparison unit 614 determines that the highest standard deviation corresponds to the red set of image data, the data set selection unit 616 selects as the target set the red set of image data (indicated by the "R" input line) from the data capturing/storage system 109, and the red set of image data is processed by the low-resolution decoding unit 618.

The low-resolution decoding unit 618 preferably includes multiple decoders that correspond to different types of optical codes that can be read by the optical code reader 100. For example, the low-resolution decoding unit 618 may include any suitable type of one-dimensional and higher-dimensional code decoder. Rather than using all the sets of image data produced by the red, green, and blue sensor pixels 204, 206, and 208 combined to decode the optical code 112, the low-resolution decoding unit 618 attempts to decode the optical code 112 using only the target set of image data. This target set of image data represents a lower-resolution image of the optical code 112 compared to the resolution represented by all the sets of image data combined.

The data processing system 110 preferably includes a low-resolution decode analysis unit 620 that analyzes the outcome of the decoding performed by the low-resolution decoding unit 618. However, the data processing system 110 need not include the low-resolution decode analysis unit 620. In general, the low-resolution decoding unit 618 achieves one of three outcomes: 1) it decodes the optical code 112 using only the target set of image data (represented by block 622), 2) it does not decode the optical code 112 but it categorizes the optical code 112 as being of a certain symbology type (represented by block 624), or 3) it does not decode and does not identify the symbology type of the optical code 112 (represented by block 626). The low-resolution decode analysis unit 620 determines the outcome achieved by the low-resolution decoding unit 618 and whether further processing is needed to decode the optical code 112. When the low-resolution decoding unit 618 successfully decodes the optical code 112 (block 622), the data processing system 110 need not perform further decoding using the non-selected sets of image data.

When the type of optical code 112 is identified but the optical code 112 is not decoded by the low-resolution decoding unit 618 (block 624), the low-resolution decoding unit 618 identified one or more features of the optical code 112 that indicate that the optical code 112 is of a certain symbology type. For example, a start or stop pattern, finder pattern, position pattern, or some other identifying feature that enables categorization of the optical code 112 may be identified by one of the decoders of the low-resolution decoding unit 618 even though the optical code 112 was not decoded. Because the optical code's type is identified, other information about the optical code 112 can be determined.

Data corresponding to the identified feature(s) are communicated to a location detection unit 628 that is operable to determine the position of the image of the optical code 112 relative to the sensor pixels on the face of the color image sensor array 102. For example, based upon the location of the image of the indentified feature(s), the location detection unit 628 is operable to determine whether all or only a portion of the image of the optical code 112 is positioned on the sensor pixels 204, 206, and 208 of the color image sensor array 102. When the location detection unit 628 determines that part of the image of the optical code 112 is not formed on the color image sensor array 102 (e.g., part of the optical code 112 is out of the field of view 108) so as to make the optical code 112 unreadable, processing is terminated and a new frame captured. Although the location detection unit 628 is described herein, the data processing system 110 need not include the location detection unit 628.

When the location detection unit 628 determines that the image of the optical code 112 is at a location sufficient for decoding, a pixel-per-module unit 630 calculates a pixel-per-module ratio to determine whether the image of the optical code 112 is sufficiently large relative to the array of sensor pixels to enable decoding of the optical code 112 using a combination of the red, green, and blue sets of image data. For example, the pixel-per-module unit 630 is operable to determine the size of the module (i.e., smallest element) of the image of the optical code 112 based upon the size of the image of the identifying feature(s) relative to the number of sensor pixels of the color image sensor array 102. In other words, the pixel-per-module unit 630 determines the number of sensor pixels 204, 206, and 208 on which the image of the identifying feature(s) is formed and, from this determination, calculates the number of sensor pixels 204, 206, and/or 208 on which the image of one module of the optical code 112 was formed. The module size relative to the size of the identifying features may be determined from the specifications of the particular type of optical code. The pixel-per-module unit 630 is also operable to compare the pixel-per-module ratio to a selected ratio that represents a minimum number of sensor pixels per module necessary to decode the optical code 112. For example, for a particular type of two-dimensional optical code, the selected ratio may be two pixels-per-module, meaning that image of the module must be large enough to cover at least two pixels 204, 206, and/or 208, and for a particular type of one-dimensional optical code, the selected ratio may be 1.2 pixels-per-module, meaning that image of the module must be large enough to cover at least 1.2 pixels 204, 206, and/or 208. If the pixel-per-module unit 630 determines that the pixel-per-module ratio is less than the selected ratio, then processing is terminated because the resolution achievable by using the red, green, and blue sets of image data collectively (i.e., full-resolution) is not adequate to decode the optical code 112. If the pixel-per-module unit 630 determines that the pixel-per-module ratio is equal to or greater than the selected ratio (i.e., full-resolution is adequate to decode the optical code 112), then the pixel-per-module unit 630 instructs a full-resolution decoding unit 632 to attempt to decode the optical code 112. Although the pixel-per-module unit 630 is described herein, the data processing system 110 need not include the pixel-per-module unit 630.

The full-resolution decoding unit 632 is operable to receive the red, green, and blue sets of image data (represented by R, G, and B input lines) stored in the data capturing/storage system 109 and decode the optical code 112 using the red, green, and blue sets of image data collectively. Because the location detection unit 628 may be used to detect the location of the image of the optical code 112 relative to the color image sensor array 102, the full-resolution decoding unit 632 may be operable to use the red, green, and blue image data produced by only the portions of the red, green, and blue sensor pixels 204, 206, and 208 located at locations that correspond to the location of the image of the optical code 112 (i.e., only those sensor pixels on which the image of the optical code 112 is formed). The full-resolution decoding unit 632 is operable to convert the intensity values represented in the red, green, and blue sets of image data to gray-scale values, in which the gray-scale values represent a monochrome image of the optical code 112. Each gray-scale value may correspond to a single intensity value of a red sensor pixel 204, green sensor pixel 206, or blue sensor pixel 208. Alternatively, multiple intensity values from different red, green, and blue sensor pixels 204, 206, and 208 may be interpolated to form the gray-scale values. Skilled persons will recognize that many different interpolation methods are known, which can be used to form the gray-scale values.

When the type of optical code 112 is not identified and the optical code 112 is not decoded using only the selected set of image data (block 626), the low-resolution analysis unit 620 instructs the full-resolution decoding unit 632 to perform full-resolution decoding of the optical code 112 using the red, green, and blue sets of image data stored in the data capturing/storage system 109. Alternatively, when the optical code 112 is not decoded and features are not identified, processing may be terminated and a new frame captured.

Figure 7:
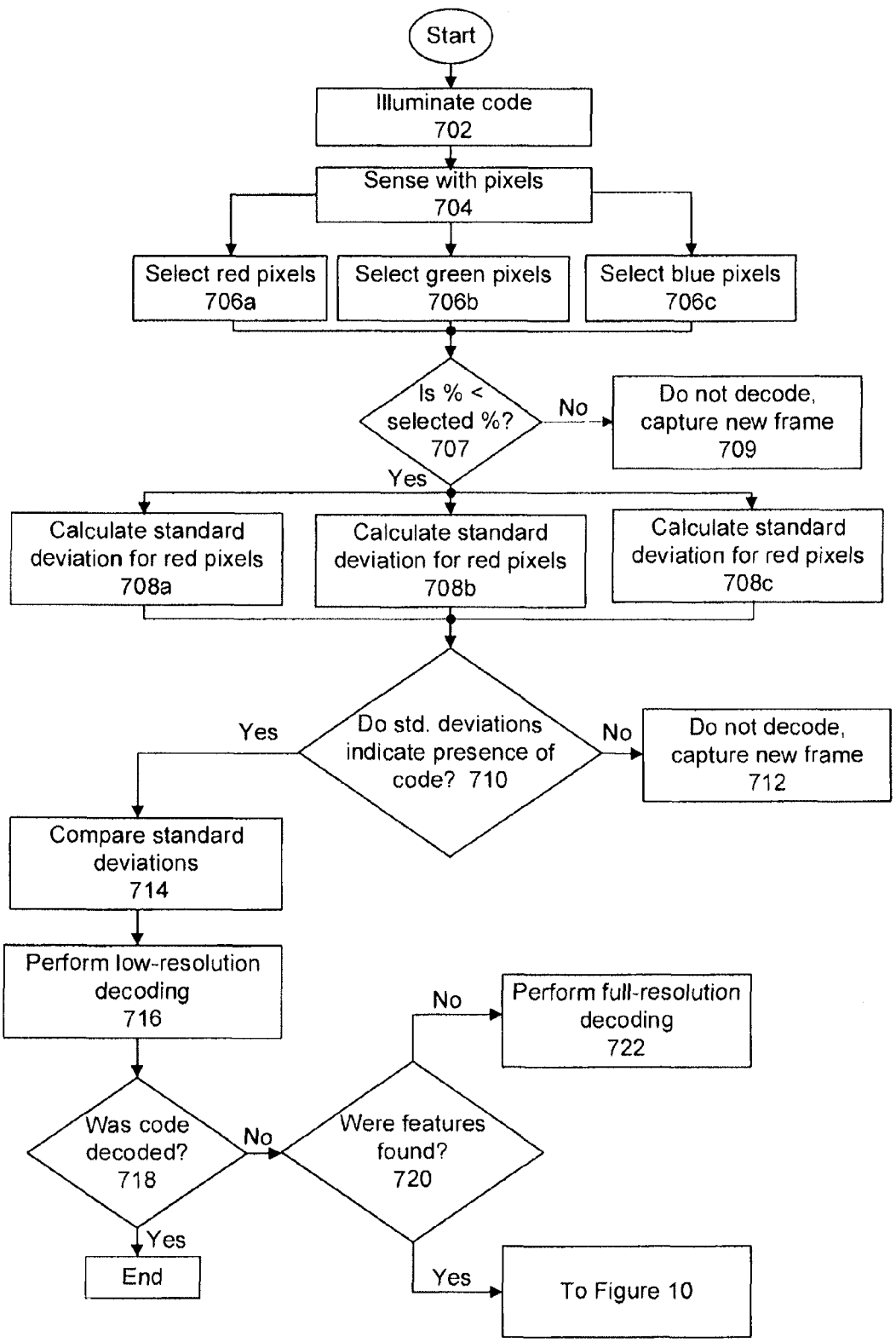
FIG. 7 is a flowchart showing the processing steps implemented by the modular processing units of FIG. 6.

A decoding method that may be performed by the data processing system 110 will now be described in more detail with reference to FIGS. 7 and 10. First, an optical code 112 is positioned in the field of view 108 of the optical code reader 100 and the illumination sources 106 are turned on to illuminate the optical code 112 (step 702). The illumination sources 106 may include red, green, and blue LEDs as described above in the illumination matching section. When different colors of illumination sources 106 are used, the illumination sources 106 may be illuminated simultaneously or sequentially. If the illumination sources 106 are illuminated simultaneously, current flow and power consumption will be higher, but full-resolution decoding of the optical code 112 may be achieved. Alternatively, instead of using illumination sources 106 to illuminate the optical code 112, ambient light may be used.

Light is reflected from the optical code 112 toward the optical system 104 and focused by the optical system 104. The focused light forms an image of the optical code 112 on the color image sensor array 102. The red sensor pixels 204, green sensor pixels 206, and blue sensor pixels 208 sense the focused light and produce, respectively, a red set, a green set, and a blue set of image data representing the sensed light intensities (step 704). The red, green, and blue sets of image data are stored in the data capturing/storage system 109. The light intensities represented in the sets of image data may be adjusted by the predetermined amounts calculated during the calibration process described above. A portion of the red set of image data, a portion of the green set of image data, and a portion of the blue set of image data may be selected by the pixel selection units 608 for further processing (steps 706a, 706b, and 706c). The selected portions of the image data correspond to subsets of sensor pixels inside the subareas 800 of the color image sensor array 102 as depicted in FIG. 8. The locations of the subareas 800 with respect to the sensor pixels of the color image sensor array 102 may be selected to form a random or uniform pattern across the color image sensor array 102. Using the subareas 800 rather than the whole image of the optical code 112 may be advantageous for reducing processing time and resources needed to decode the optical code 112.

A histogram of the light intensities sensed by the sensor pixels of the subareas 800 may be calculated, and the histogram is compared to the selected histogram threshold to determine the percentage of light intensity values at or below the histogram threshold (step 707). If the percentage of light intensity values at or below the histogram threshold is greater than or equal to the selected percentage, the image is not processed (step 709). The color image sensor array 102 captures a new image and overwrites the old image.

On the other hand, if the percentage of light intensities at or below the histogram threshold is less than the selected percentage, then standard deviations of light intensities sensed by the red, green, and blue sensor pixels 204, 206, and 208 located in subareas 800 may be calculated by the standard deviation calculation units 610 (steps 708*a*, 708*b*, and 708*c*). For example, the standard deviation calculation unit 610 of the red channel may calculate the standard deviation of a subarea 800 according to the following steps:

1) calculate the mean of the red intensity values produced by the red pixels 204 located in the subarea 800;
2) calculate for each red intensity value, its deviation from the mean;
3) calculate the squares of the deviations from the mean;
4) calculate the mean of the squared deviations (i.e., the variance); and
5) calculate the square root of the variance.

These steps are expressed in equation 1 below:

$$\text{standard deviation} = \sqrt{\frac{1}{N}\sum_{i=1}^{N}(x_i - \mu)^2} \quad (1)$$

where $x_i$ represents a red intensity value, $\mu$ represents the mean of the intensity values, and N represents the number of red intensity values corresponding to the subarea 800. The standard deviations of the different subareas 800 are averaged for the different channels 602, 604, and 606 and the averages are used as the standard deviations of the channels 602, 604, and 606. Alternatively, the highest standard deviation of a subarea 800 for a given channel may be selected as the standard deviation for that channel.

The standard deviations may be compared to the selected threshold level in the threshold comparison units 612 to identify whether a portion of the optical code 112 is present in any one of the red, green, or blue color planes (step 710). For example, the optical code 112 may be out of the field of view 108 such that no dark and light elements of the optical code 112 are discernable in any of the red, green, and blue color planes.

Processing may be terminated and a new frame is captured by the color image sensor array 102 when the standard deviations of the channels 602, 604, and 606 indicated that no optical code 112 is discernable in any of the color planes (step 712). If one or more of the standard deviations indicate that a portion of the optical code 112 is detected in at least one of the red, green, or blue color planes, the standard deviation comparison unit 614 may compare the standard deviations to identify the channel 602, 604, or 606 with the highest standard deviation (step 714). If the standard deviation associated with one of the colors is higher than the other standard deviations, the set of image data corresponding to the color with the highest standard deviation is selected by the data set selection unit 616. If the final standard deviations are approximately the same, any one of the red, green, or blue sets of image data may be selected by the data set selection unit 616. The low-resolution decoding unit 618 receives the selected set of image data and attempts to decode the optical code 112 (step 716). As described above, the low-resolution decoding unit 618 preferably includes multiple decoders that correspond to different symbology types of optical codes. For example, the low-resolution decoding unit 618 may include a decoder for one or more of the following symbology types: UPC, codabar, code 25, code 39, code 93, code 128, codell, EAN2, EAN13, plessy, POSTNET, aztec code, maxicode, QR code, high-capacity color barcode, and data matrix, to name a few. Skilled persons will recognize that many other symbology types exist and the low-resolution decoding unit 618 may include decoders for one or more of these other symbology types.

The low-resolution decode analysis unit 620 determines whether the optical code 112 was decoded by the low-resolution decoding unit 618 (step 718). If the optical code 112 was decoded, processing of the image data stops and the results obtained by the low-resolution decoding unit 618 are transmitted to other systems for further processing and/or storage. If the optical code was not decoded, the low-resolution decode analysis unit 620 may determine whether one or more identifying features that indicate the type of optical code were found by the low-resolution decoding unit 618 (step 720). If identifying features were not found, the full-resolution decoding unit 632 performs full-resolution decoding of the optical code 112 by using the red, green, and blue sets of image data collectively (step 722).

Figure 10:
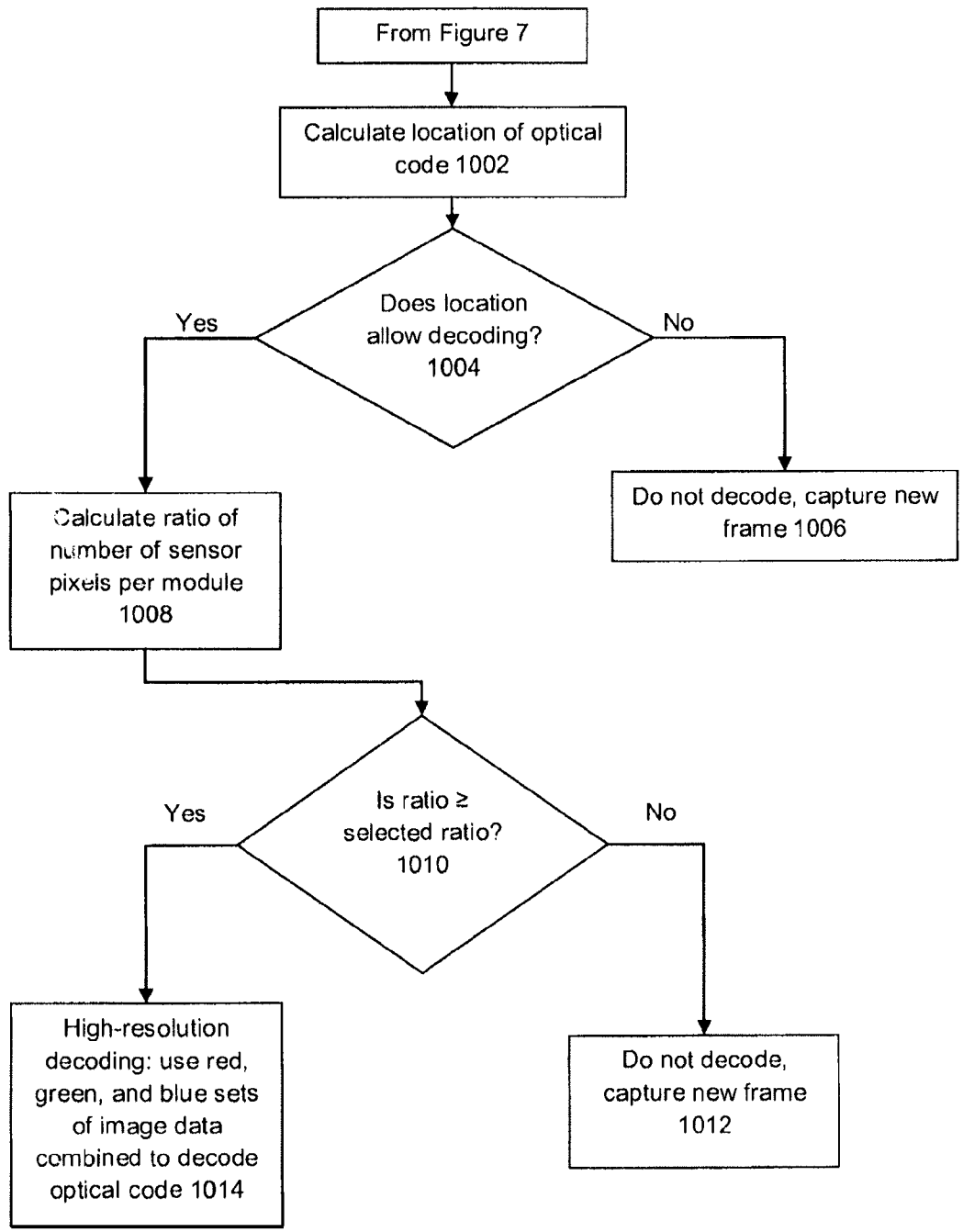
FIG. 10 is a flowchart showing the processing steps implemented by the modular processing units of FIG. 6.

If identifying features were found, the location of the image of the optical code 112 may be determined by the location detection unit 628 (step 1002) (see FIG. 10). The location detection unit 628 determines whether the location of the image of the optical code 112 allows the optical code to be decoded using full-resolution imaging (step 1004). If the location of the image of the optical code 112 does not allow decoding using full-resolution decoding (e.g., part the image of optical code 112 is not focused on the color image sensor array 102), processing may be terminated and a new frame is captured by the color image sensor array 102 (step 1006).

If the location of the image of the optical code 112 is sufficient for full-resolution decoding, the pixel-per-module unit 630 may calculate the size of the image of the module of the optical code 112 and the pixel-per-module ratio (step 1008). The pixel-per-module unit 630 compares the pixel-per-module ratio to the selected ratio to determine whether the pixel-per-module ratio is greater than or equal to the selected ratio (step 1010). If the pixel-per-module ratio is not greater than or equal to the selected ratio, processing terminates and a new frame is captured by the color image sensor array 102 (step 1012). If the pixel-per-module ratio is greater than or equal to the selected ratio, the full-resolution decoding unit 632 performs full-resolution decoding using all of the image data of the red, green, and blue sets or portions of the red, green, and blue sets corresponding to the sensor pixels on which the image of the optical code was formed (step 1014).

Thus, the data processing system 110 is operable to analyze certain statistics of the image data representing the optical code 112 to determine which set of image data to use for decoding and to determine whether to decode the optical code in high-resolution.

V. Multiple Window Reader

Figure 11:
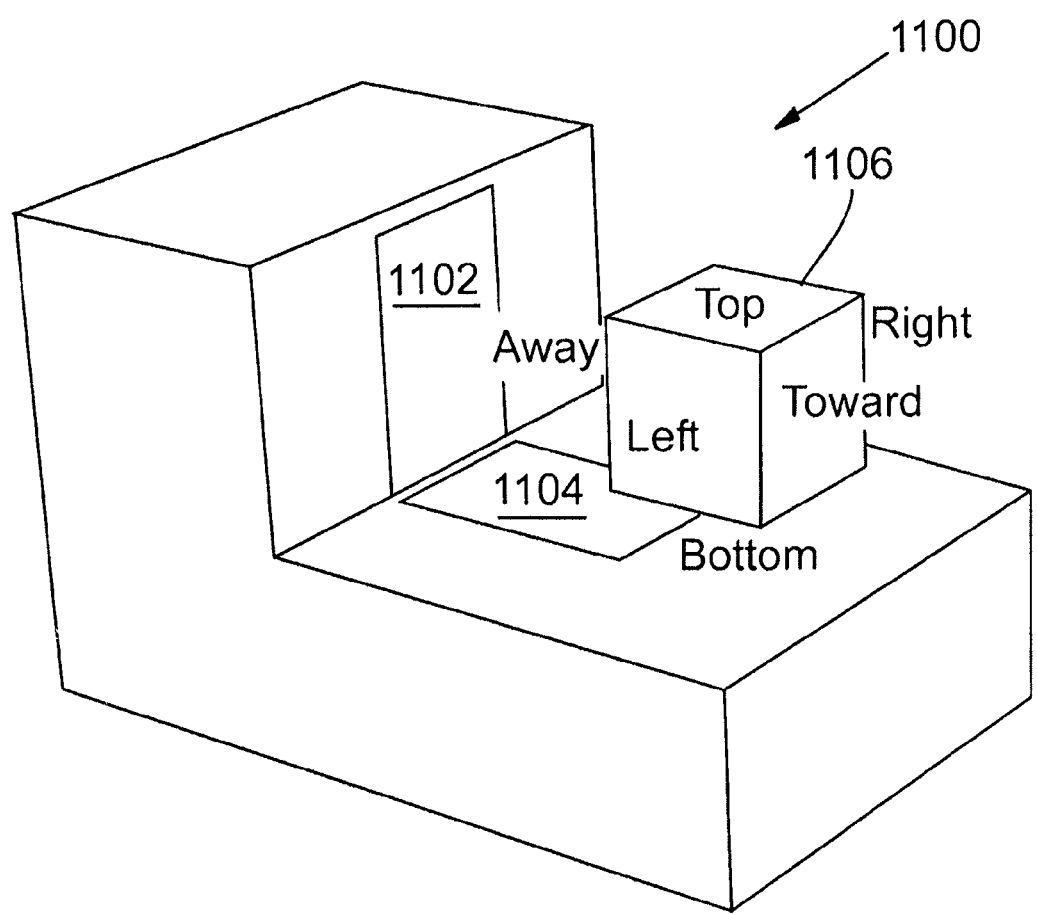
FIG. 11 is a perspective view of a multiple window reader that includes a color image sensor array.

Embodiments of a multiple window reader that includes the color image sensor array 102 will now be described with reference to FIGS. 11-14. A multiple window reader may comprise two or more windows. Typically, each window is arranged to face the read region/volume from a different direction, the windows being oriented in different planes. FIG. 11 diagrammatically illustrates a two window reader 1100 which may be referred to as a bioptic reader. The bioptic reader 1100 may include all or some the features described above with reference to the optical code reader 100 or these features may be omitted. The bioptic reader 1100 includes two windows 1102 and 1104 that provide multiple views of an object 1106 to be scanned. For example, a bottom, top, right, left, toward, and away sides of the object 1106 may be scanned by the bioptic reader 1100 through the use of optics including light directing optics (e.g., mirrors, lenses) and wavelength selective reflective optics described in more detail below.

Figure 12:
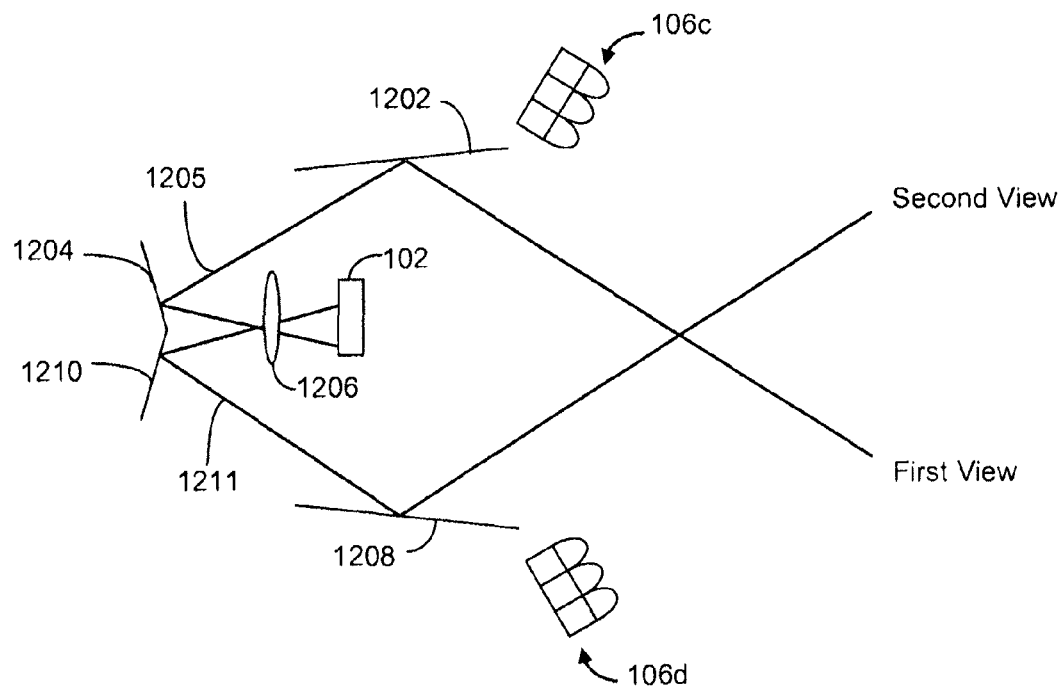
FIGS. 12 and 13 are schematics of respective top and side views of various parts of the multiple window reader of FIG. 11 according to one embodiment.
Figure 13:
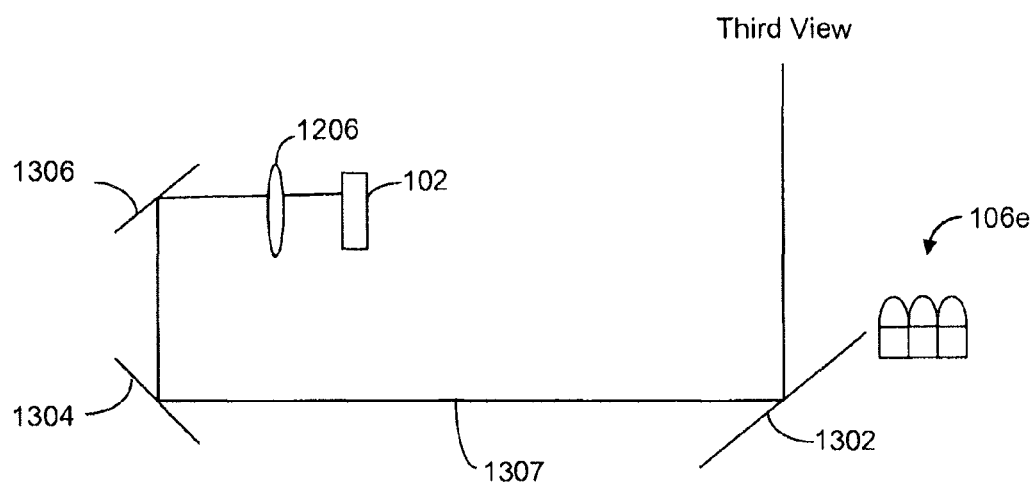

In a first embodiment of the bioptic reader 1100, different views of the object 1106 (in this example, different transverse directions) are focused on different regions on the face of the color image sensor array 102, and the image data produced by the different regions are processed to detect and decode the optical code 112 of the object 1106. For example, FIGS. 12 and 13 are schematics representing respective top and side views of portions of the bioptic reader 1100 according to the first embodiment. For clarity, FIGS. 12 and 13 include representations of only three views of the object 1106. In the example of FIGS. 12 and 13, the first, second, and third views correspond to respective right, left, and bottom side views of the object 1106. However, the first, second, and third views may correspond to views other than the right, left, and bottom sides of the object 1106. Additionally, more or less than three views of the object 1106 may be focused on the color image sensor array 102. Each view may be illuminated by ambient light or by an artificial illumination source. Each view may include its own illumination source 106c, 106d, or 106e as shown in FIGS. 12 and 13. For example, the first view may be illuminated by illumination sources 106c, the second view may be illuminated by illumination sources 106d, and the third view may be illuminated by illumination sources 106e. For each view, the red, green, and blue lights of illumination sources 106c, 106d, or 106e may be illuminated sequentially or, preferably, at approximately the same time (e.g., the red, green, and blue illumination sources 106c for the first view are illuminated at approximately the same time). Additionally, the illumination sources 106c, 106d, and 106e for the different views may illuminated sequentially or, preferably, at approximately the same time.

Mirrors 1202 and 1204 are positioned in the bioptic reader 1100 to direct light for travel along a first path 1205 from the first view of the object 1106 to a lens 1206. The lens 1206 focuses the light traveling along the first path 1205 on a first region of the color image sensor array 102. Mirrors 1208 and 1210 are positioned in the bioptic reader 1100 to direct light for travel along a second path 1211 from the second view to the lens 1206. The lens 1206 focuses the light traveling along the second path 1211 on a second region of the color image sensor array 102. Mirrors 1302, 1304, and 1306 are positioned in the bioptic reader 1100 to direct light for travel along a third path 1307 from the third view to the lens 1206. The lens 1206 focuses the light traveling along the third path 1307 on a third region of the color image sensor array 102. The mirrors 1202, 1204, 1208, 1210, 1302, 1304, and 1306 are positioned so that the images of the first, second, and third views are formed on different regions of the color image sensor array 102. In other words, the color image sensor array 102 is divided into three regions, each region being dedicated to one of the three views.

By dividing the color image sensor array 102 into multiple regions, the object 1106 can be scanned from multiple views with a single imager. For example, when the object 1106 is placed in close proximity to the bioptic reader 1100, the first, second, and third regions of the color image sensor array 102 capture images of, respectively, the first, second, and third views of the object. Image data generated by the red, green, and blue sensor pixels 204, 206, and 208 of the first region are processed as described above to determine whether the optical code 112 of the object is visible from the first view and to decode the optical code 112 if it is visible from the first view. Likewise, image data generated by the red, green, and blue sensor pixels 204, 206, and 206 of the second and third regions may be independently processed as described above to decode the optical code 112 when it is visible from, respectively, the second and third views. Thus, if the optical code 112 on the object being scanned is within one of the three views, the optical code 112 may be decoded by processing the image data that corresponds to the appropriate region of the color image sensor array 102. Image data generated by the three regions may be processed sequentially (image data from the first region is processed, then image data from the second region is processed, etc.) or at the same time. The bioptic reader 1100 may include more than three views, and, accordingly, the color image sensor array 102 may be divided into more than three regions. In one example, color image sensor array 102 is divided into six regions in which each region corresponds to one of six views of the bioptic reader 1100.

Figure 14:
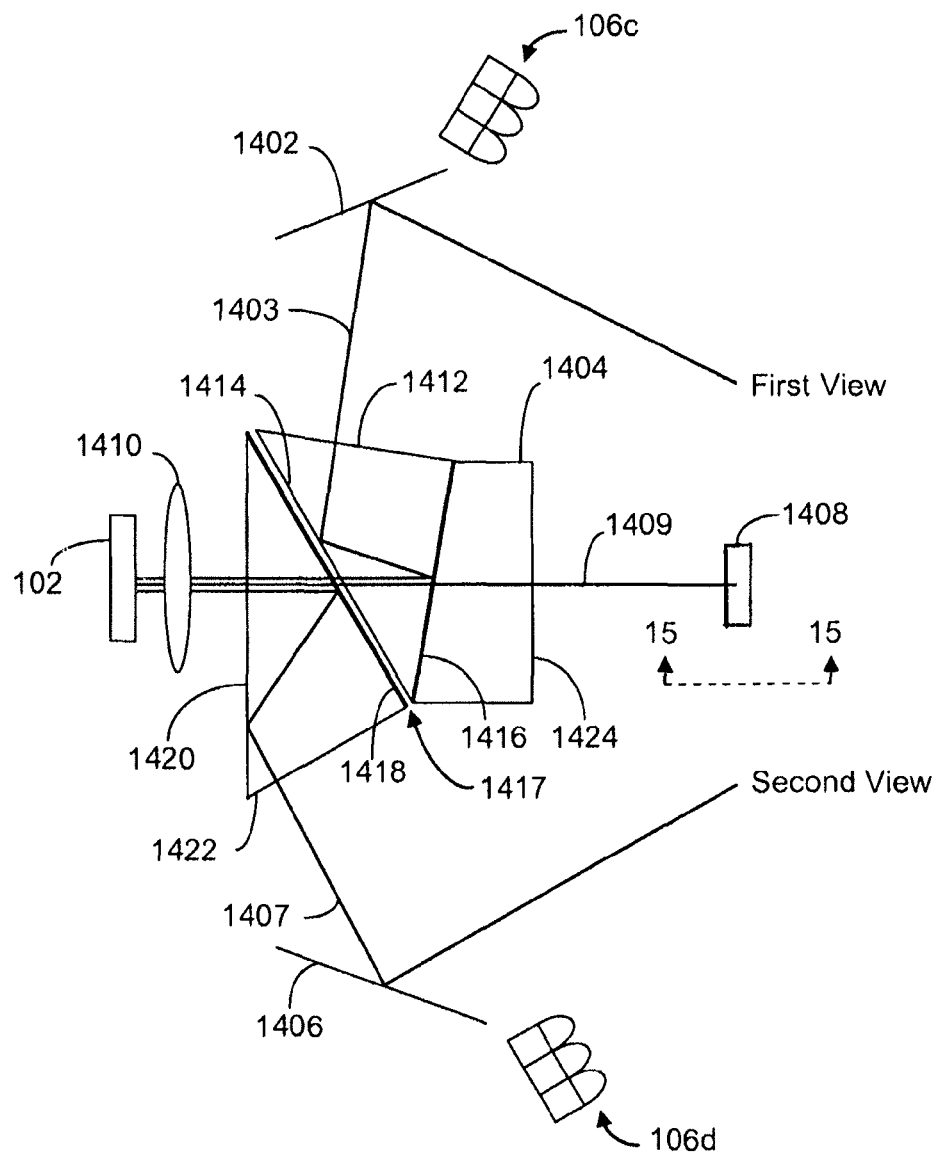
FIG. 14 is a schematic of a top view of various parts of the multiple window reader of FIG. 11 according to another embodiment.
Figure 15:
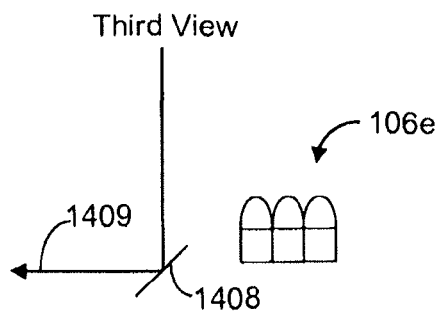
FIG. 15 is a schematic of a side view of the multiple window reader taken along the line 15-15 of FIG. 14.

FIG. 14 is a schematic of a top view of the bioptic reader 1100 according to a second embodiment and FIG. 15 is a detailed side view taken along the line 15-15 of FIG. 14. Like the first embodiment, the bioptic reader 1100 includes the color image sensor array 102. In FIGS. 14 and 15, the first, second, and third views correspond to respective right, left, and bottom side views of the object 1106. However, the first, second, and third views may correspond to views other than the right, left, and bottom sides of the object 1106. Each view may be illuminated by ambient light or by an artificial source. In one example, each view includes its own illumination sources 106 (described above) as shown in FIGS. 12 and 13. For example, the first view may be illuminated by illumination sources 106c, the second view may be illuminated by illumination sources 106d, and the third view may be illuminated by illumination sources 106e. For each view, the red, green, and blue lights of illumination sources 106c, 106d, or 106e may be illuminated sequentially or, preferably, at approximately the same time (e.g., the red, green, and blue illumination sources 106c for the first view are illuminated at approximately the same time). Additionally, the illumination sources 106c, 106d, and 106e for the different views may illuminated sequentially or, preferably, at approximately the same time. In an alternative example to that depicted in FIGS. 14 and 15, each view may include one or more illumination sources that emits light having only wavelengths corresponding to the color red, green, or blue. For example, the illumination source(s) corresponding to the first view may emit light having wavelengths corresponding only to the color red (red light), the illumination source corresponding to the second view may emit light having wavelengths corresponding only to the color blue (blue light), and the illumination source corresponding to the third view may emit light having wavelengths corresponding only to the color green (green light).

A mirror 1402 is positioned in the bioptic reader 1100 to direct light for travel along a first path 1403 from the first view to a beam combining prism 1404. A mirror 1406 is positioned in the bioptic reader 1100 to direct light for travel along a second path 1407 from the second view to the prism 1404. A third mirror 1408 is positioned in the bioptic reader 1100 to direct light for travel along a third path 1409 from the third view to the prism 1404.

The prism 1404 is an example of one type of wavelength selective reflective optics that may be used in this second embodiment of FIGS. 14 and 15. Use of other types of wavelength selective reflective optics is contemplated. Examples of other suitable wavelength selective reflective optics include one or more beam splitters/combiners, dichroic prisms, and trichroic prisms. Specific examples include cross dichroic prisms, RGB prisms, Kester type prisms, and Phillips prisms. The wavelength selective optics preferably include one or more optical coatings for separating light into different paths according to wavelength. The second embodiment is described with reference to the prism 1404 (which corresponds to a Phillips type prism) and its corresponding configuration. However, skilled persons will recognize that use of other types of wavelength selective reflective optics may require modifications to the configuration shown in FIGS. 14 and 15.

The prism 1404 functions to direct light for travel along the first, second, and third paths 1403, 1407, and 1409 to a lens 1410. The lens 1410 focuses the light traveling along the first, second, and third paths 1403, 1407, and 1409 on the color image sensor array 102. The prism 1404 is operable to divert (e.g., filter out) from the first, second, and third paths 1403, 1407, and 1409 light of certain wavelengths so that each color of the color image sensor array 102 is dedicated to only one of the three views. For example, the prism 1404 may effectively filter out blue light and green light traveling along the first path 1403 so that only red light is directed from the first view to the color image sensor array 102 to thereby form an image of the first view. Thus, blue and green light may be substantially excluded from the image of the first view.

Moreover, the prism 1404 may operate so that only blue light is directed from the second view to the color image sensor array 102 and only green light is directed from the third view to the color image sensor array 102. Thus, according to the example, the red sensor pixels of the color image sensor array 102 will sense an image of the first view without substantially sensing images of the second and third views, the blue sensor pixels of the color image sensor array 102 will sense an image of the second view without substantially sensing images of the first and third views, and the green sensor pixels of the color image sensor array 102 will sense an image of the third view without substantially sensing images of the first and second views.

In a preferred method/system, the prism 1404 may function as follows. Light (that may include red, green, and blue light) emanating from the first view and reflected off the mirror 1402 travels along the first path 1403 and passes through a first side 1412 of the prism 1404. This light undergoes total internal reflection at a second side 1414 of the prism 1404. The light reflected off the second side 1414 travels along the first path 1403 toward a first optical coating 1416. The first optical coating 1416 is designed to reflect red light and to transmit blue and green light. Thus, red light is reflected off the first optical coating 1416 and along the first path 1403 back toward the second side 1414, and blue and green light transmit (e.g., pass) through the first optical coating 1416 and out of the prism 1404 in a direction away from the lens 1410 and the color image sensor array 102. Thus, the blue and green light emanating from the first view are diverted from the first path 1403. The red light travels along the first path 1403 and passes through the second side 1414, an air gap 1417, a second optical coating 1418, and a third side 1420 toward the lens 1410. The lens focuses the red light on the color image sensor array 102 to form an image of the first view. The second optical coating 1418 is designed to reflect blue light and to transmit red and green light.

Light (that may include red, green, and blue light) emanating from the second view and reflected off the mirror 1406 travels along the second path 1407 and passes through a fourth side 1422 of the prism 1404. This light undergoes total internal reflection at the third side 1420. The light reflected off the third side 1422 travels along the second path 1407 toward the second optical coating 1418. Blue light is reflected off the second optical coating 1418 back toward the third side 1420 and red and green light pass through the second optical coating 1418 and out of the prism 1404 in a direction away from the lens 1410 and color image sensor array 102. Thus, the red and green light emanating from the second view are diverted from the second path 1407. The blue light passes through the third side 1420 toward the lens 1410 and is focused on the color image sensor array 102 to form the second image of the second view.

Light (that may include red, green, and blue light) emanating from the third view and reflected off the mirror 1408 travels along the third path 1409 and passes through a fifth side 1424 of the prism 1404 to the first optical coating 1416. Green and blue light pass through the first optical coating 1416 to the second side 1414 and red light is reflected off the first optical coating 1416 out of the prism 1404 in a direction away from the lens 1410 and the color image sensor array 102. Thus, the red light emanating from the third view is diverted from the third path 1409. The green and blue light pass through the second side 1414 and the air gap 1417 to the second optical coating 1418. The green light passes through the second optical coating and the third side 1420 toward the lens 1410 and the blue light is reflected off the second optical coating 1418 out of the prism 1404 in a direction away from the lens 1410 and the color image sensor array 102. Thus, the blue light emanating from the third view is diverted from the third path 1409. The lens 1410 focuses the green light on the color image sensor array 102 to form the third image of the third view.

When an object is placed in close proximity to the bioptic reader 1100, the red sensor pixels of the color image sensor array 102 produce a red set of image data representing an image of the first view, the green sensor pixels of the color image sensor array 102 produce a green set of image data representing an image of the third view, and the blue sensor pixels of the color image sensor array 102 produce a blue set of image data representing an image of the second view. The red, green, and blue sets of image data are preferably processed separately to decode an optical code of the object. For example, if the optical code is visible from the first view, the red set of image data may be used to decode the optical code. By dedicating the red, green, and blue sensor pixels of the color image sensor array 102 to different views, a single color imager can decode an optical code from multiple views. Moreover, multiple views of the bioptic reader 1100 may be captured simultaneously by a single color imager. The bioptic reader 1100 of the second embodiment may capture more (or less) than the three views described above. For example, three views can be directed through the prism 1404 and focused on a first portion (e.g., a first half) of the color image sensor array 102 and three other views can be directed through the prism 1404 (or a second prism) to a second portion (e.g., a second half) of the color image sensor array 102. In this example, some of the red sensors pixels are dedicated to one view, while the other red sensor pixels are dedicated to another view. Likewise, the blue sensor pixels are divided to capture two different views and the green sensor pixels are divided to capture two different views for a total of six views. In another example, the color image sensor array 102 may include more (or less) than three colors and the wavelength selective reflective optics may be modified to produce more (or less) than three views, in which each view is dedicated to a different color.

Certain embodiments may be capable of achieving one or more of the following advantages: (1) enabling utilization of lower cost color imagers in optical code readers; (2) improving light efficiency and/or sensitivity of an optical code reader; (3) calibrating light intensities values sensed by a color imager without appreciably increasing processing requirements; (4) improving decoding of optical codes by selecting the color channel in which the optical codes are most distinguishable; (5) lowering processing time by selecting and using image data produced by a single color channel to decode an optical code; (6) enabling selection of full-resolution decoding by analyzing image data produced by a single color channel; and (7) using a single color imager to decode of optical codes visible from multiple views of a bioptic reader. Combinations of the above embodiments, and other embodiments not specifically described herein will be apparent to skilled persons upon reviewing the above description. Though the present invention has been set forth in the form of the embodiments described above, it is nevertheless intended that modifications to the disclosed systems and methods may be made without departing from inventive concepts set forth herein. The scope of the invention should therefore be determined only by the following claims and their equivalents.

The invention claimed is:

1. An optical code reader comprising:
    a color image sensor array including:
        a first set of sensor pixels sensitive to a first wavelength of light, and
        a second set of sensor pixels sensitive to a second wavelength of light different from the first wavelength of light; and
    optics forming on the color image sensor array a first image of a first view of an object and a second image of a second view of the object, wherein the first image is formed by light of the first wavelength emanating from the first view and the second image is formed by light of the second wavelength emanating from the second view, the optics substantially excluding from the first image light of the second wavelength emanating from the first view and substantially excluding from the second image light of the first wavelength emanating from the second view to thereby enable the sensor pixels of the first set to sense the first image without substantially sensing the second image and the sensor pixels of the second set to sense the second image without substantially sensing the first image.

2. The optical code reader of claim 1, wherein the optics include:
    a first mirror positioned to provide the first view of the object, the first mirror arranged to direct along a first path the light of the first wavelength emanating from the first view;
    a second mirror positioned to provide the second view of the object, the second mirror arranged to direct along a second path the light of the second wavelength emanating from the second view; and
    wavelength selective reflective optics positioned to intersect the first and second paths, the wavelength selective reflective optics substantially excluding from the first image the light of the second wavelength emanating from the first view and substantially excluding from the second image the light of the first wavelength emanating from the second view.

3. The optical code reader of claim 2, wherein the wavelength selective reflective optics include a beam splitter.

4. The optical code reader of claim 3, wherein the wavelength selective reflective optics include a dichroic prism.

5. The optical code reader of claim 2, wherein the wavelength selective reflective optics include an optical coating directing along the first path the light of the first wavelength emanating from the first view and diverting from the first path the light of the second wavelength emanating from the first view, the optical coating positioned so that the light of the first wavelength traveling along the first path is incident on the color image sensor array and the light of the second wavelength emanating from the first view travels out of the wavelength selective reflective optics in a direction away from the color image sensor array to thereby prevent the light of the second wavelength emanating from the second view from contributing to the formation of the first image on the color image sensor array.

6. The optical code reader of claim 5, wherein the optical coating is reflects the light of the first wavelength traveling along the first path and to transmits the light of the second wavelength emanating from the first view to divert the light of the second wavelength from the first path.

7. The optical code reader of claim 5, wherein the optical coating is transmits the light of the first wavelength traveling along the first path and reflects the light of the second wavelength emanating from the first view to divert the light of the second wavelength from the first path.

8. The optical code reader of claim 5, wherein:
    the optical coating is a first optical coating,
    the direction away from the color image sensor array is a first direction, and
    the wavelength selective reflective optics include a second optical coating directing along the second path the light of the second wavelength emanating from the second view and diverting from the second path the light of the first wavelength emanating from the second view, the second optical coating positioned so that the light of the second wavelength traveling along the second path is incident on the color image sensor array and the light of the first wavelength emanating from the second view travels out of the wavelength selective reflective optics in a second direction away from the color image sensor array to thereby prevent the light of the first wavelength emanating from the second view from contributing to the formation of the second image on the color image sensor array.

9. The optical code reader of claim 8, wherein the second optical coating reflects the light of the second wavelength traveling along the second path and transmits the light of the first wavelength emanating from the second view to divert the light of the first wavelength from the second path.

10. The optical code reader of claim 1, wherein the color image sensor array includes a third set of sensor pixels sensitive to a third wavelength of light different from both the first and second wavelengths of light, the optics providing for the optical code reader a third view of the object, and the optics forming on the color image sensor array a third image of the third view wherein the third image is formed by light of the third wavelength emanating from the third view, the optics substantially excluding from the third image light of the first wavelength emanating from the third view and light of the second wavelength emanating from the third view.

11. The optical code reader of claim 10, wherein the optics include:
    a first mirror positioned to provide the first view of the object, the first mirror arranged to direct along a first path the light of the first wavelength emanating from the first view;
    a second mirror positioned to provide the second view of the object, the second mirror arranged to direct along a second path the light of the second wavelength emanating from the second view;
    a third mirror positioned to provide the third view of the object, the third mirror arranged to direct along a third path the light of the third wavelength emanating from the third view; and
    wavelength selective reflective optics positioned to intersect the first, second, and third paths.

12. The optical code reader of claim 11, wherein the wavelength selective reflective optics include:
- a first optical coating directing along the first path the light of the first wavelength emanating from the first view and diverting from the first path one or both of the light of the second wavelength emanating from the first view and the light of the third wavelength emanating from the first view, the first optical coating positioned so that the light of the first wavelength traveling along the first path is incident on the color image sensor array and the light diverted from the first path travels out of the wavelength selective reflective optics in a first direction away from the color image sensor array; and
- a second optical coating directing along the second path the light of the second wavelength emanating from the second view and diverting from the second path one or both of the light of the first wavelength emanating from the second view and the light of the third wavelength emanating from the second view, the second optical coating positioned so that the light of the second wavelength traveling along the second path is incident on the color image sensor array and the light diverted from the second path travels out of the wavelength selective reflective optics in a second direction away from the color image sensor array.

13. The optical code reader of claim 12, wherein one or both of the first and second optical coatings directs along the third path the light of the third wavelength emanating from the third view and diverts from the third path one or both of the light of the first wavelength emanating from the third view and the light of the second wavelength emanating from the third view.

14. The optical code reader of claim 12, wherein the wavelength selective reflective optics include a trichroic prism.

15. The optical code reader of claim 1, wherein the optical code reader is a multi-window reader.

16. A method of data reading via an optical code reader having light directing optics and a color image sensor array, the color image sensor array including a first set of sensor pixels sensitive to light of a first wavelength and a second set of sensor pixels sensitive to light of a second wavelength, the light directing optics providing a first view of an object positioned in a read region of the optical code reader and a second view of the object, the method comprising:
- directing light emanating from the first view along a first path to the color image sensor array to form a first image of the first view on the color image sensor array, the light emanating from the first view including light of the first wavelength and light of the second wavelength;
- directing light emanating from the second view along a second path to the color image sensor array to form a second image of the second view on the color image sensor array, the light emanating from the second view including light of the first wavelength and light of the second wavelength;
- diverting from the first path in a first direction away from the color image sensor array the light of the second wavelength emanating from the first view so that the first image substantially excludes the light of the second wavelength emanating from the first view, the light of the first wavelength emanating from the first view traveling along the first path to the color image sensor array to form the first image of the first view on the color image sensor array; and
- diverting from the second path in second direction away from the color image sensor array the light of the first wavelength emanating from the second view so that the second image substantially excludes the light of the first wavelength emanating from the second view, the light of the second wavelength emanating from the second view traveling along the second path to the color image sensor array to form the second image of the second view on the color image sensor array.

17. The method of claim 16, further comprising forming the first and second images on the color image sensor array at the same time.

18. The method of claim 16, further comprising:
- sensing the first image using the first set of sensor pixels; and
- sensing the second image using the second set of sensor pixels.

19. The method of claim 16, wherein the color image sensor array includes a third set of sensor pixels sensitive to light of a third wavelength and the light directing optics provide a third view of the object, the method further comprising:
- directing light emanating from the third view along a third path to the color image sensor array to form a third image of the third view on the color image sensor array, the light emanating from the third view including light of the first wavelength, light of the second wavelength, and light of the third wavelength; and
- diverting from the third path the light of the first wavelength emanating from the third view and the light of the second wavelength emanating from the third view so that the third image substantially excludes the light of the first wavelength emanating from the third view and the light of the second wavelength emanating from the third view, the light of the third wavelength emanating from the third view traveling along the third path to the color image sensor array to form the third image of the third view on the color image sensor array.

* * * * *

UNITED STATES PATENT AND TRADEMARK OFFICE
CERTIFICATE OF CORRECTION

| | | Page 1 of 1 |
|---|---|---|
| PATENT NO. | : 8,998,092 B2 | |
| APPLICATION NO. | : 14/307373 | |
| DATED | : April 7, 2015 | |
| INVENTOR(S) | : WenLiang Gao | |

It is certified that error appears in the above-identified patent and that said Letters Patent is hereby corrected as shown below:

In the Specification

In column 2, line 3, replace "effectively achieve high-speed" with --effectively achieved high-speed--.

In column 4, line 29, replace "include storage devices" with --includes storage devices--.

In column 4, line 49, replace "object or the like" with --objects or the like--.

In column 6, line 34, replace "sensor pixel effects" with --sensor pixel affects--.

In column 7, line 29, replace "values of red set" with --values of the red set--.

In column 14, line 56, replace "all or some the features" with --all or some of the features--.

In column 16, lines 33-34, replace "views may illuminated" with --views may be illuminated--.

In column 19, line 4, replace "decode of optical codes" with --decode optical codes--.

In the Claims

In column 20, line 7, replace "coating is reflects the light" with --coating reflects the light--.

In column 20, line 8, replace "and to transmits the light" with --and transmits the light--.

In column 20, line 12, replace "coating is transmits the light" with --coating transmits the light--.

In column 22, line 13, replace "path in second direction" with --path in a second direction--.

Signed and Sealed this
Twenty-eighth Day of July, 2015

Michelle K. Lee
*Director of the United States Patent and Trademark Office*